June 25, 1935. W. H. ARMACOST Re. 19,619

ANTISLAGGING ARRANGEMENT

Original Filed March 2, 1932 2 Sheets-Sheet 1

INVENTOR
Wilbur H. Armacost.

BY O. V. Thiele
ATTORNEY

June 25, 1935. W. H. ARMACOST Re. 19,619

ANTISLAGGING ARRANGEMENT

Original Filed March 2, 1932 2 Sheets-Sheet 2

INVENTOR
Wilbur H. Armacost
BY O. V. Thiele
ATTORNEY

Reissued June 25, 1935

Re. 19,619

UNITED STATES PATENT OFFICE 19,619

ANTISLAGGING ARRANGEMENT

Wilbur H. Armacost, New York, N. Y., assignor to The Superheater Company, New York, N. Y.

Original No. 1,983,333, dated December 4, 1934, Serial No. 596,234, March 2, 1932. Application for reissue January 26, 1935, Serial No. 3,629

9 Claims. (Cl. 122—303)

My invention relates to coal fired superheater boilers designed to operate at high combustion rates.

With the adoption of mechanical firing means for coal such as stokers and powdered fuel burners, it was found that the high combustion rates permitted or made economically feasible by such means caused serious slagging of the generating tubes nearest the furnace in the case of boilers of the well known straight tube type. It has, therefore, become the practice in such boilers having mechanical coal firing means to arrange several horizontal rows of generating tubes which lie nearest the furnace to form an anti-slagging screen or bank. In such so-called "slag bank", the water tubes are placed farther apart thereby widening the passages for the gas and ash between the tubes and permitting the ash particles to cool enough by radiation prior to contacting with a water cooled surface to prevent their adhesion to such surface. The wide passages between the tubes further prevent bridging between the tubes even when a certain amount of slagging occurs. In the straight tube type of water tube boiler furthermore, it has become customary to separate a portion of the generating tubes from another to provide a so-called interdeck space for the reception of a superheater. Such an arrangement of the superheater has been found advantageous in many respects, but the present tendency is toward ever increasing final steam temperatures, and many recent installations and, others in contemplation, require a steam temperature difficult to obtain by an interdeck superheater as previously constructed. It is possible to increase the superheat derived from a superheater in the inter deck position by another of the radiant type but this involves considerable additional expense. Moreover, the tubes of a superheater are ordinarily arranged much closer together than are the generating tubes of a boiler so that the tendency to slag across the superheater tubes is greater than is the case with steam generating tubes at an equal distance from the fire. It has therefore been impossible to increase the temperature of steam delivered by an interdeck superheater by moving it relatively closer to the furnace because of difficulties from slagging.

It is the principal object of my invention to provide an arrangement whereby an interdeck superheater may be arranged to give steam of relatively high temperature in a mechanically fired coal burning superheater boiler while preventing difficulties from slagging of the superheater.

Further objects and advantages of my invention will be apparent to those skilled in the art from the following description taken with the accompanying drawings.

The novel features of my invention are pointed out in the appended claims. In order that the invention may be easily and fully understood, however, I will now describe in detail and in connection with the accompanying drawings, a boiler and two forms of superheater units selected by way of example from a number of possible embodiments of my invention. In the drawings, Fig. 1 is a sectional elevation of a mechanically fired superheater boiler having my invention applied thereto.

Figure 1:
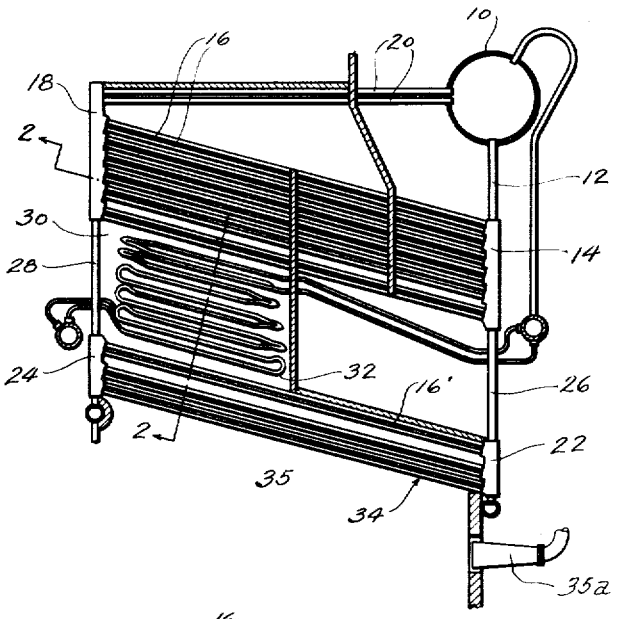

In the ordinary interdeck superheater boiler, there is employed a steam and water drum 10 connected by downcomers 12 to headers 14 from which extend somewhat upwardly tubes 16, 16 forming an upper generating bank and connecting at their upper ends with headers 18 from which steam and water are delivered to drum 10 thru circulators 20, 20. Below the headers 14 and 18 and spaced therefrom are two other groups of headers 22 and 24, respectively. Headers 22 are connected to headers 14 by downcomer nipples 26 and headers 24 are connected to headers 18 by riser nipples 28. It will be seen that the nipples 26 and 28 are sufficiently long to provide an interdeck space 30 for a superheater 32. Extending between headers 22 and 24 are two horizontal rows of generating tubes 16', 16', set the same distances apart both vertically and horizontally as the tubes 16. Below the tubes 16' and also extending between headers 22 and 24 is an anti-slagging bank or screen 34. Below screen 34 is the usual furnace chamber 35 and a burner 35a for powdered coal is shown for feeding fuel to such chamber.

Figure 2:
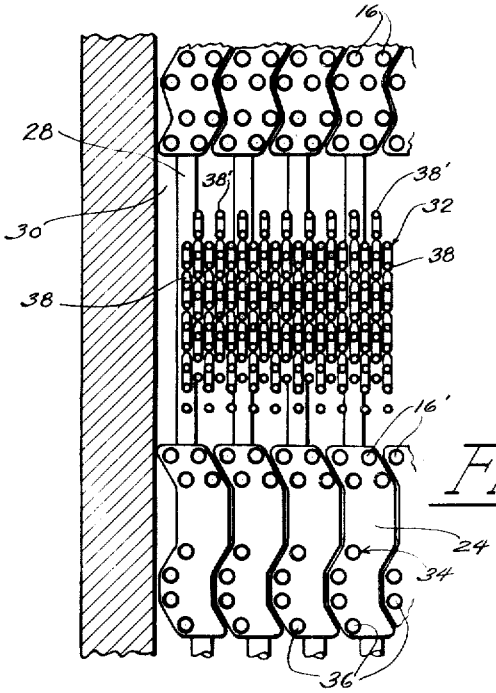
Fig. 2 is a fragmentary section on line 2—2 of Fig. 1.

Ordinarily, the tubes in slag screens such as 34 are spaced horizontally the same distance between centers as the tubes 16 and 16' but are spaced vertically a somewhat greater distance than tubes 16 and 16'. In order, however, that the gases striking the superheater 32 may be hotter than has been the custom previously, and thereby to enable such superheater to deliver steam at higher temperature, I have given the bank 34 a special arrangement which achieves the desired object but which involves a minimum of additional expense. In the arrangement illustrated every other tube in each horizontal row of bank 34 is omitted although the usual number of tubes in the vertical direction as normally used in such banks is retained, namely, four. However, headers 22 and 24 in the vertical zone covered by tubes 36 of bank 34 are so formed that the tubes 36 are arranged in groups of four, so set that the centers of the various groups forming bank 34 define parallel arcs, the top and bottom tubes of each group being in a given vertical line and the two intermediate tubes of each group also being on a given vertical line, but offset slightly from the line of the top and bottom tubes thereby providing relatively wide and unobstructed lanes for the passage of gas therethru. The spaces between adjacent rows of tubes 16' and 36 are, of course, unimpeded as otherwise the desired rates of combustion in furnace 35 could not be obtained. The gases therefore reach the tubes of the superheater 34 at a considerably higher temperature than in the ordinary arrangement. As shown in Fig. 2 and as is ordinarily the case, the tubes of the elements 38 and 38' of superheater 34 are arranged much closer together than the generating tubes 16 and 16'. Also, the metal temperature of elements 38 and 38' is higher than that of tubes 16' so that, unless special means were provided, difficulty from slagging of the superheater tubes would occur when operating at the ordinarily high rates of combustion employed at present with mechanically fired coal burning boiler furnaces. In order to avoid such difficulty, I have arranged the elements 38 so that they begin lower down than the alternate elements 38' and therefore end at a lower level so that the lowermost row of tubes of the superheater 32 is more widely spaced than is the case throughout the body of the superheater thereby providing a zone of material vertical height in which the ash particles in the gases have a relatively low velocity and may lose sufficient heat to the superheater elements by radiation to prevent slagging of the tubes in the zone of the superheater in which the tubes are closely spaced.

Figure 3:
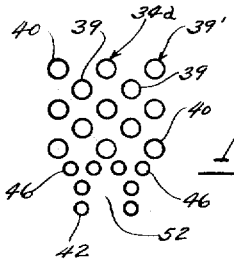
Fig. 3 is a fragmentary section of a portion of a superheater adapted for use in my invention, but having a different form of unit from that illustrated in Figs. 1 and 2 and taken on a line corresponding to only a part of the line 2—2.
Figure 4:
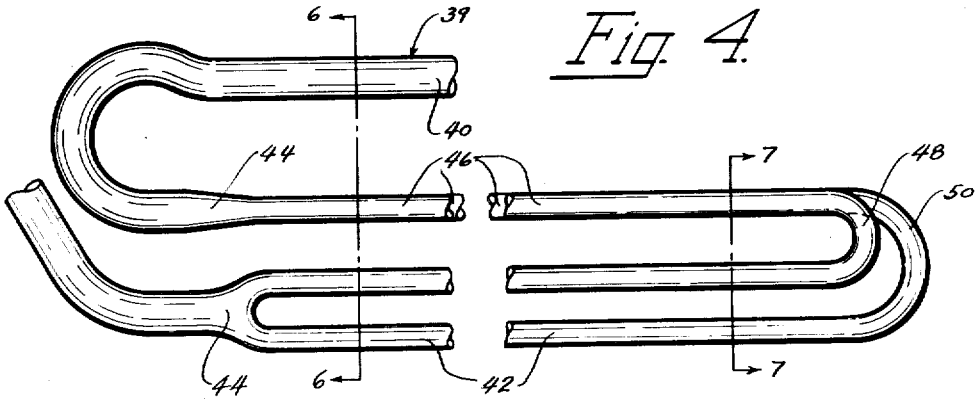
Fig. 4 is a detail view in elevation of a portion of one of the units of the type shown in Fig. 3.
Figure 5:
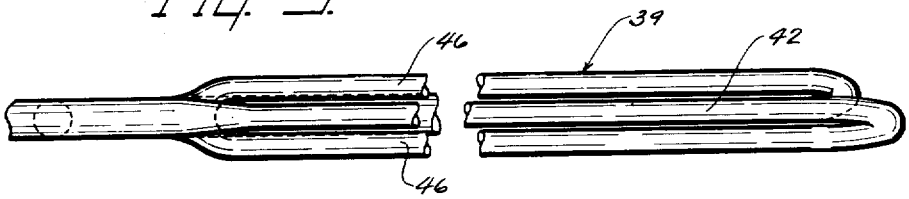
Fig. 5 is a bottom plan view of the element shown in Fig. 4.
Figure 6:
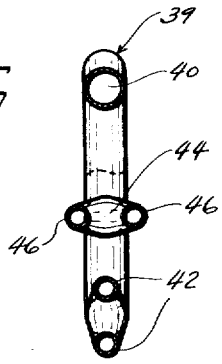
Fig. 6 is a section on the line 6—6 of Fig. 4, looking in the direction of the arrows.
Figure 7:
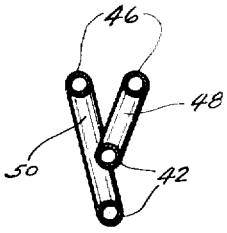
Fig. 7 is a section on the line 7—7 of Fig. 4, looking in the direction of the arrows.

However, various arrangements may be used for obtaining relatively wide spacing of the tubes of the superheater in a zone along the lower edge thereof and I have illustrated in Figs. 3 to 7 inclusive a form of unit different from that appearing in Figs. 1 and 2, but equally well adapted to achieve the desired result. As appears clearly from Figs. 1 and 2, the units 38 and 38' have their tubes of the same diameter. In the superheater 34a illustrated in Fig. 3, however, the alternate units 39 and 39' are not alike, units 39' having only tubes 40 of uniform size, while units 39 have upper portions composed of tubes 40 of larger size than the tubes 42 composing the lower portions of such units. As appears more clearly in Figs. 4, 5 and 6, the steam in units 39 flows in series thru the tubes 40 and 42, the lower ends of the tubes 40 of elements 39 being bifurcated at points 44 so that each tube 40 of such an element delivers to a pair of tubes 42, 42, the upper portions 46, 46 of which lie in a given horizontal plane. The parts 46 of the small diameter tubes, however, are connected by return bends 48 and 50 with the lower portions of the tubes 42 which lie one above the other in the same vertical plane as the tube portions 40 of the same element, bends 48 and 50 lying in planes inclined toward each other, as appears in Fig. 7, and bend 50 being of greater diameter than bend 48 to permit the change in position of the small tubes of a given pair as just described. The elements 39' which alternate with elements 39 do not have any small tubes 42. As appears clearly from Figs. 3 and 6, the resulting arrangement of the tubes 40 and 42 is such as to provide relatively wide spaces 52 between adjacent pairs of tubes 42 in the zone along the bottom of the superheater composed of elements 39 and 39'. In Fig. 3, tube sections 46 are shown as quite close to the lower row of tubes 40. This is due to the fact that the lower rows of tubes 40 in elements 39' are at a lower level than the lower rows of tubes 40 in elements 39. However, I do not limit myself to this.

It will be understood further that I do not intend to limit myself in all cases to details of the foregoing description and that the appended claims are to be taken in their broad sense.

What I claim is:

1. A boiler having a bank of generating tubes inclined to the horizontal, a plurality of rows of water tubes between which the gas flow is unimpeded, forming a group having an anti-slagging effect and spaced below said bank, and a superheater between said bank and said second mentioned tubes and so arranged that all the gases passing between said rows pass also between the tubes of the superheater, said superheater having those of its tubes adjacent its lower side arranged to produce a substantial additional anti-slagging effect whereby said superheater may receive higher temperature gases without slagging up than would otherwise be the case.

2. A superheater boiler having a bank of generating tubes inclined to the horizontal, additional generating tubes below and spaced from said bank but having the same distance between centers as the tubes in said bank, water tubes below said additional tubes having approximately twice the horizontal spacing between centers as the tubes of said bank to produce an anti-slagging effect, and a superheater in the space between said tube bank and the tubes immediately below it and so arranged that all the gases passing between said rows pass also between the tubes of the superheater, said superheater having the tubes in the zone along its lower side arranged to produce a substantial anti-slagging effect additional to that produced by said water tubes.

3. The combination as set forth in claim 2 and in which the last group of tubes is arranged to form parallel arcuate lanes for the gases.

4. A boiler having a furnace and mechanical means for feeding coal thereto, a bank of generating tubes inclined to the horizontal and arranged to receive heating gases from said furnace, a plurality of rows of water tubes intermediate said bank and said furnace and set farther apart on the average than those of said bank to have an anti-slagging effect, and a superheater intermediate said bank and said second mentioned tubes and so arranged that all the gases passing between said rows pass also between the tubes of the superheater, said superheater having those of its tubes adjacent its lower side arranged to produce a substantial additional anti-slagging effect whereby said superheater may receive higher temperature gases without slagging-up than would otherwise be the case.

5. A superheater element adapted for use in an anti-slagging superheater and having a relatively large tube arranged to deliver to a pair of relatively small tubes, said smaller tubes having two sections lying parallel in a given plane and two other sections lying parallel but in a plane substantially at right angles to that of said first mentioned pair of sections, and connections whereby said first mentioned sections deliver to said second mentioned sections, said second mentioned pair of sections lying substantially in the same plane with a larger tube of the element.

6. The combination in a superheater boiler of a main bank of generating tubes, a group of tubes spaced below said bank and set farther apart on the average than the tubes of said bank to have an anti-slagging effect, and a superheater in the space between said bank and said groups and arranged to provide an additional anti-slagging effect, said superheater being so arranged that all the gases passing through said group of tubes pass also between the tubes of the superheater.

7. The combination in a superheater boiler of a group of generating tubes arranged to have an anti-slagging effect, a superheater adjacent said tubes and arranged to have an additional anti-slagging effect, and additional generating tubes above said superheater and set closer together than those of said group.

8. The combination in a superheater boiler of a group of steam generating tubes arranged to have an antislagging effect, and a superheater adjacent to said tubes and following them in the direction of gas flow and arranged to have an additional anti-slagging effect.

9. The combination in a superheater boiler of a group of steam generating tubes inclined somewhat from the horizontal and arranged to have an anti-slagging effect, and a superheater comprising tubes adjacent and parallel to said steam generating tubes and following them in the direction of gas flow and arranged to have an additional anti-slagging effect.

WILBUR H. ARMACOST.